United States Patent [19]

Oman et al.

[11] 3,845,467

[45] Oct. 29, 1974

[54] ANALOG SIGNAL TRANSMISSION SYSTEM FOR DIGITAL DATA COMMUNICATION SYSTEM

[75] Inventors: Gary F. Oman, Greendale; Lawrence J. Strojny, West Allis; Paul H. Froehling, Franklin; Stuart R. Buchanan, Mequon, all of Wis.

[73] Assignee: Johnson Service Company, Milwaukee, Wis.

[22] Filed: Dec. 15, 1972

[21] Appl. No.: 315,463

[52] U.S. Cl. .................... 340/147 R, 340/163

[51] Int. Cl. .................... H04q 5/00

[58] Field of Search .................... 340/163, 147 K

[56] References Cited

UNITED STATES PATENTS

| | | | |
|---|---|---|---|
| 3,518,628 | 6/1970 | Giel | 340/163 X |
| 3,522,588 | 8/1970 | Clarke | 340/163 X |
| 3,652,993 | 3/1972 | Bridwell | 340/163 X |
| 3,728,681 | 4/1973 | Fuller | 340/163 R |

*Primary Examiner*—Harold I. Pitts
*Attorney, Agent, or Firm*—Andrus, Sceales, Starke & Sawall

[57] ABSTRACT

A loop communication system includes digital data for communication between a message frame generating controller and remote stations, some of which include analog signal sources, the outputs of which are converted to digital form for processing. A separate analog transmission trunk which is preferably a twisted, shielded wire pair connects the analog remote stations to an analog to digital converter at a spaced converter remote station. Each analog remote station includes a connection module for actuating an isolating switch circuit to complete a connection to the trunk. The switch prevents multipoint grounding to a guarded input instrumentation amplifier at the remote converter station. An analog select module connects one of the analog sources to the switch circuit. The module also includes analog range and function for transmission over the communication loop. The modules are activated by the communication loop system and then function to complete the conversion, after which the converter station requests a frame and instructs the loop controller to read the digitized analog signal and clear the system. The analog to digital converter preferably includes a guarded instrumentation amplifier having a gain of 1 connected to drive a voltage to frequency converter to digitize the analog data. The several analog remote stations and preferably the connection module includes status monitoring means to signal the loop system if the connection means or the analog signal coupling to the switch fails. Each remote station preferably includes a by-pass switch responsive to selected faults which also actuates the switch to prevent connection to the analog trunk. The system is then free to process other analog points.

34 Claims, 4 Drawing Figures

ANALOG SIGNAL TRANSMISSION SYSTEM FOR DIGITAL DATA COMMUNICATION SYSTEM

BACKGROUND OF INVENTION

This invention relates to analog signal measurement and transmission with means for converting the analog information to digital form for processing of the information and transmitting the signal from one station or location to another.

Control and monitoring systems may incorporate a substantial number of remotely located analog sensing and signal generating means. The information is desirably transmitted over a data communication system from the several distributed locations to one or more processing or control stations. For maximum efficiency and simplicity of circuit design, the several remote stations are preferably connected to the central stations through a common transmission path, with the several stations selectively sharing the common transmission path on a time basis. In this manner; the several analog signals can be received at a central station or location and coupled to a processing instrument such as a recorder, display indicator, analog to digital converter, and the like. A highly practical communication network for high speed transfer of information in coded digital message units or frames is described in the copending application of Buchanan et al. entitled "DATA COMMUNICATION SYSTEM EMPLOYING A SERIES LOOP" which bears U.S. Pat. Ser. No. 315,567 and was filed on Dec. 15, 1972, the same day as this application and is assigned to the same assignee.

The time sharing control system must, of course, provide means for the transmission of the analog signal with appropriate identification of the location. The transmission of analog signals, particularly over long distance and at relatively high speeds, is difficult. Generally, such information has been transmitted at a relatively slow speed in order to permit complete distinguishing of the information signal from noise signals which are added inherently to the information signal in most practical and commercial transmission systems. The scanning and transmission of a plurality of analog signals is of course limited by the analog measurement time. Digital communication systems can operate at high speed and the superimposing of the analog measurement function prevents the maximum use of the system.

High level analog systems have also been suggested wherein an operational amplifier is employed for transmitting the analog signals to a remote analog to digital converter. The incoming signals are parallel connected and multiplexed to the transmitting system through the use of analog switches in the form of field effect transistor units and decoding logic circuitry which are all connected to a common trunk cable for carrying both the logic switching signals and the analog signals. Such a system is undesirable, however, in that the common trunk connection of the transmitters and signal sources inherently produces circulating ground current and digital switching signals which are superimposed upon the analog signal as the latter travels over the trunk cable to the central converter. The parallel circuit connection also prevents the use of a guarded input instrumentation amplifier as there is a multiple-point grounding of the guard shield. Although the analog to digital converter and the source amplifiers have a reasonable degree of resolution, units with significantly greater accuracies are available if the system can be properly grounded.

Generally, range and function information for the various analog points is stored at the processor, in either hardware or software form, and the incoming information properly processed in combination with such information. This requires significant assignment of the processor memory where a large number of different transducers are in the same system. Further, as analog points are added or changed in the system, the point description and related information must be introduced into the processor memory system. This can result in additional expense and complication which it is desirable to eliminate in low-cost systems.

SUMMARY OF THE PRESENT INVENTION

The present invention is particularly directed to an improved analog measurement system forming a part of a high-speed digital communication system, wherein the analog signal transmission means does not limit or restrict the high-speed operation of the digital communication system and thereby permits a more efficient utilization of the communication system. In accordance with the present invention, the analog source means or unit is formed as an integrated self-contained part of a remote station, with a coded interlock to a loop controller through a data communication loop system. The remote analog means includes a coded switching system responsive to the digital information transmitted over the loop. The analog signal, however, is transmitted via a separate cable or trunk to an anlog to digital converter. The communication loop system merely initiates the analog signal transmission and operation of the analog to digital conversion. Once initiated, the analog system proceeds independently of the loop communication which may proceed with other digital communication, thus maintaining the advantages associated with the high-speed digital systems.

The analog signals are generally converted to digital form with appropriate engineering units for appropriate readout, either as a visual display, a printed record, or the like in digital form. The conversion is a quantitizing process which can be done to a very high degree of precision and is normally so done in certain processing controls. As a result, the analog to digital conversion instruments, however, are relatively complex and, consequently, correspondingly expensive. Although it is technically possible to provide an analog to digital converter at each remote point, it is not economically feasible in essentially most commercial installations. If the system is sufficiently large, it might be possible to provide two or three analog to digital converters with the various analog to digital converters assigned to various remote stations. Each analog to digital converter is thereby assigned to and shared by a plurality of the selected analog remote stations. The separate analog transmission cable interconnects the several remote stations to the corresponding analog to digital converter. The analog transmission cable is preferably a twisted, shielded wire pair permitting single point grounding.

In accordance with an optimum and particularly novel construction, each of the related remote stations having analog inputs is equipped with a pair of point modules, one of which includes a connection means for actuating an isolating circuit operable to interconnect the analog transmission trunk or cable to the analog bus of the related remote station. A highly satisfactory isolation circuit is provided by using relays having the coils connected in a coded logic circuit to respond to an incoming message frame. Relay contacts connect the remote station bus to the analog trunk. The interconnecing relay is preferably a three-pole isolation relay having individual contacts connected to a source high line and low line to the transmission lines and the common ground to the cable shield. In addition, the second of said pair of modules is a point selection module which includes an analog select and latch circuit for selectively connecting any one of the plurality of analog transmitters to the station bus and thereby to the analog trunk via the relay contacts.

The point selection module in a particular construction of this invention includes hardware for the necessary related analog range and function information. This information is in an appropriately coded form for transmission over the transmission lines. The system thus permits the selection of a point module and the multiplexing of the analog range and frunction information via the communication cable to the processor. The processor is not, therefore, required to burden the memory system with such information for the several analog points. This not only increases system efficiency but minimizes the system cost, particularly where expansion is required.

The serial loop digital system in combination with the separate analog data transmission system further permits optimum construction of the instrumentation amplifier at the analog to digital converter as a guarded input unit can be employed because there is a single grounding of the guard shield. As a result, the accuracy and noise immunity of the system can be significantly increased.

The analog to digital converter is preferably constructed with a guarded differential input instrumentation amplifier having a gain of 1 and providing common mode noise rejection. The instrumentation amplifier drives a voltage to frequency converter, the output of which is precisely integrated over a very precise time period to provide normal mode noise rejection. The integrating circuit is controlled by a control point module which is actuated from the loop system and produces analog data in digital coded form which is, in turn, interfaced with the loop communication system. The analog to digital converter unit can be located at any remote or central location with the separate analog intercommunication line. Further, it could, of course, be independently provided at each station if the cost factors are not of consequence and the separate, extended analog trunk line eliminated. This, of course, would allow the simultaneous processing of analog signals at each and every remote station. The costs would generally, however, be prohibitive with respect to the conventional automatic system such as the building automation systems employing loop communication controls.

The several analog remote stations and preferably the connection means module includes monitoring means to signal the loop system if the connection means or the analog signal module fails to operate.

Further, each station preferably includes by-pass means responsive to selected faults. The connection means is interlocked to also respond and disconnect the station from the analog trunk. The essentially self-contained functioning of the several analog modules and the related analog trunk system thus permits continued communication with other properly functioning analog point module stations, even though one or more of the other stations become inoperative and disconnected from the loop.

The present invention provides a versatile analog to digital signal control for high-speed communication systems wherein the number of the analog points can be readily increased within the basic limitations of the communication network with a minimum of additional changes in the system as such. The separate analog transmission system in particular maintains the advantages of, and efficient utilization of, high-speed digital communication systems with improved accuracy in the transmission of analog signals.

BRIEF DESCRIPTION OF THE DRAWINGS

The drawings furnished herewith illustrate a preferred construction of the present invention in which the above advantages and features are clearly disclosed as well as others which will be readily understood from the following description.

In the drawings.

DESCRIPTION OF ILLUSTRATED EMBODIMENTS

Figure 1:
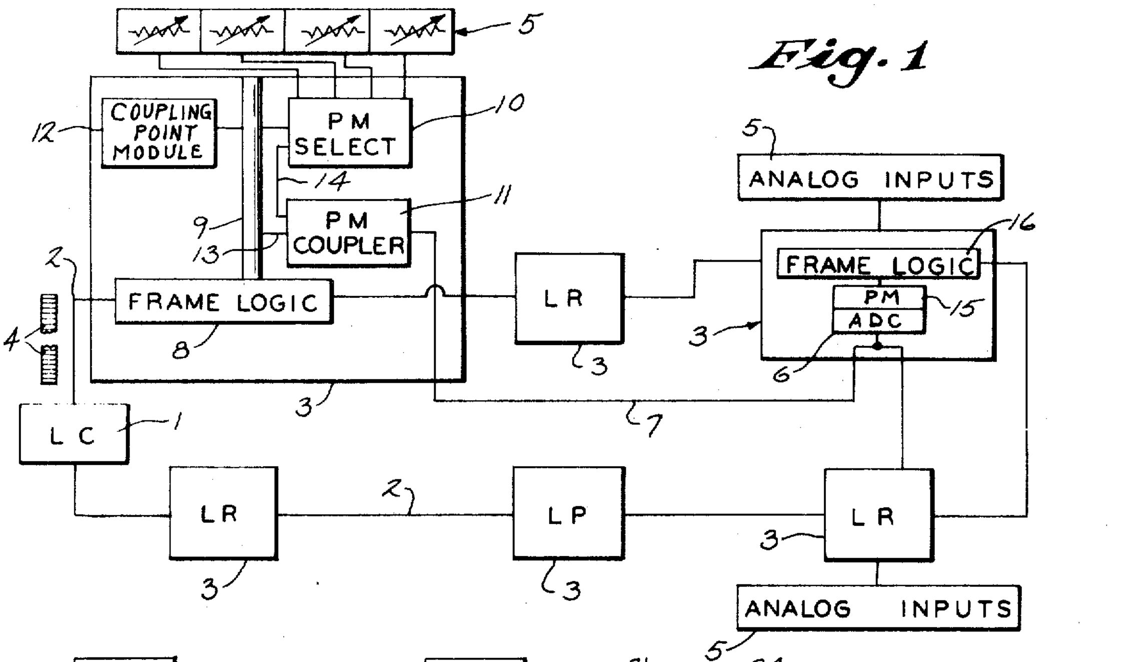
FIG. 1 is a block diagram of a loop data communication apparatus including an analog measurement and transmission system.

Referring to the drawings and particularly to FIG. 1, the present invention is shown applied to a data communication loop system employing a central loop controller 1 serially coupled by a loop communication cable 2 to a plurality of remote stations 3, generally as more fully disclosed in the previously referred to Buchanan et al application. The central controller 1 generates a series of message frames 4, each of which includes a plurality of digital logic bits. The message frames 4 are circulated in serial fashion throughout the loop to establish communication with the several remote stations 3 in a selected manner. Each of the remote stations 3 controls various load means for producing various controlling and monitoring functions, and some of which will constitute analog signal source means 5 shown in block diagram in FIG. 1. Thus, a heating, ventiliating and air condition system for a building or complex of buildings may include various contact and drive means for controlling the operating means as well as sensing devices for monitoring the conditions and system operation. The several remote stations 3 may control and monitor selected operating groups, which are further divided into related functional groups. The present invention is particularly related to the reading and processing of the output of the analog source means and in particular converting them to digital form for processing. In accordance with the present invention an analog to digital converter unit 6 is provided at a selected converting station 3 and connected to one or more of the other remote analog signal transmitting stations 3 via a separate analog transmission trunk or cable 7 to provide servicing of a plurality of analog inputs on time sharing basis. Each of the remote stations 3 including an analog input is provided with means which connect the analog inputs in a selected manner to the analog transmission cable 7 for analog to digital conversion. During the conversion, the communication loop is free to continue other functions and message processing. When the conversion is terminated the analog to digital converter unit 6 generates an interrupt signal to indicate the termination thereof and to provide the necessary message communication with the loop controller 1 for subsequent processing.

One of the remote stations 3 including a plurality of analog inputs 5 is shown in detail for purposes of clearly describing the embodiment of the present invention. Each of the other remote stations 3 including similar analog inputs would be similarly constructed to allow the selective processing of the analog signals.

The first remote station 3 downstream of the loop controller 1 includes a frame logic handling means 8 which is connected via a common bus 9 to a pair of related analog point modules 10 and 11, as well as to a plurality of other point modules 12. The latter modules 12 may selectively control a plurality of other forms of hardware such as contacts, motors and other drives, monitoring loads and the like or additional analog signal sources.

The present invention is particularly directed to the interconnection of analog signal modules into the communication system and the other type controls are not shown or described.

The central controller 1 generates the message frames 4 in the time spaced sequence. The frames are divided into a plurality of coded bytes each having multiple bits as disclosed in the Buchanan et al application and particularly including a station address byte, a point module address byte, as well as command and status check bytes and a final function control byte. The frame handling means 8 will detect the initial byte of the message frame 4 and, if appropriate, couple the message frame to the appropriate point modules 10 – 12 for processing of each bit of the message. The associated point module hardware is activated in accordance with the instructions or command of the message frame 4.

If the message frame 4 is to activate the first station 3 for processing of the analog input units 5, analog point modules 10 and 11 are activated to connect the transmission trunk 7 via the bus 9. The connection point module 11 includes an input line 13 to the station bus 9 and is responsive to a coded input to provide an isolated connection between the analog point module 10 and a connecting line 14 to the transmission trunk 7.

The point module 10 functions to selectively connect one of the analog inputs 5 at the remote station 3 onto the bus path or line 14, which is separately shown for clarity and simplicity of explanation. The line 14 is connected by the coupling point module 11 to the transmission line 7.

The analog point module 10 connects a single analog input to the coupling point module 12 at any given time. The loop controller 1 is programmed to scan the remote station 3 and the several analog inputs to sequentially activate the several analog readouts, as more fully developed hereinafter.

The coupling point module 11 functions primarily as a switching device to maintain isolation between the analog transmission line 7 and the digital loop communication cable 2. This is desirable to eliminate direct current path between the remote stations and prevent any accumulation of leakage current from the second level solid state switching onto the transmission line 7.

In the illustrated embodiment of the invention, a first message frame 4 is directed to the remote station 3 to activate the coupling point module 11. A second frame 4 is addressed to the corresponding remote station 3 to activate the related analog point module 10 which selects the particular analog signal 5 and establishes analog signal transmission to the transmission trunk 7. A message frame 4 is now sent to the remote station 3 including the analog to digital converter unit 6 which includes a point module 15, for controlling of unit 6. This station 3 is provided with the necessary frame handling means 16 which connects the frame 4 to an analog converter module 15 and initiates operation of the analog to digital converter unit 6.

During the period that the analog to digital conversion is being completed via line 7, the communication loop is free to perform such other tasks as required including the circulation of the various forms of frames 4 over the communication cable 2. The analog to digital converter 6 automatically senses the termination of the conversion and activates an interrupt signal source of the module 15, as subsequently described. This results in the receiving of an available message frame 4 which is filled by the analog to digital converter point module 15 with the corresponding address and transmitted as a notification frame to the loop controller 1. The loop controller then generates a series of message frames including a first frame directed to the converter remote station 3 to clear the interrupt and read the converter output. In a practical construction, the output of the converter may be a fourteen bit data word, with the two significant bytes read by successive message frames. Thus, the interrupt clear frame may read one byte.

This frame 4 when properly received by the controller results in a second frame 4 including a read command to receive the most significant data bits into the message frame. After receiving the final piece of information, the loop controller 1 now generates a clear frame 4 which is directed to the active analog remote station 3 which responds thereto by examining all of the analog sources 5 at the corresponding remote station and disconnects that unit which had been previously connected. If another analog point 5 in the same remote station 3 is to be read, the transmission line module 11 will not clear. The loop controller 1 will again send a command frame to the corresponding remote station connecting the next selected analog source 5 to properly actuate the selection system for connection to the signal transmission trunk 7. When in the scanning sequence, the last analog point in a remote station has been read, a final station clear frame is generated by the loop controller with a logic signal which actuates the active remote station 3 to clear both the analog select module and the connection line module. The scanning by the loop controller 1 is then directed to another remote station including one or more analog points.

The separate communication loop and analog transmission system provides essential isolation therebetween such that the high-speed computer network is permitted to operate with maximum efficiency. Further, the isolated analog transmission system allows the construction of an optimum analog transmission system with very accurate converting and driving electronic circuitry.

Figure 2:
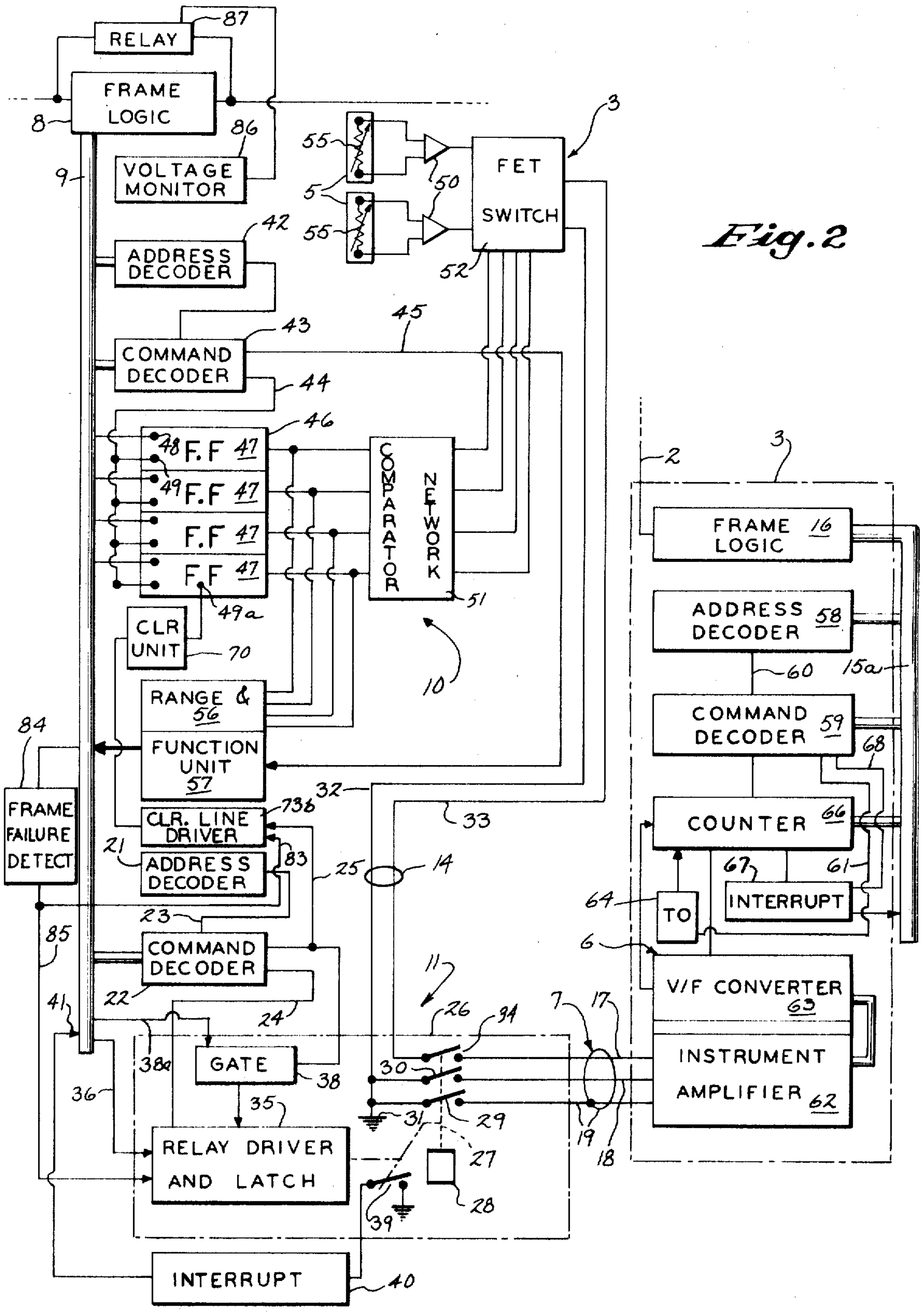
FIG. 2 is an expanded block diagram of the analog transmission apparatus between a selected transmitting station and a signal converting station to illustrate the modular high level analog transmission of FIG. 1.

Thus, in a preferred construction of the present invention as shown in FIG. 2, the analog transmission trunk 7 is a pair of twisted shielded wires 17 and 18, having an outer shield 19 interconnected from the analog to digital converter unit 6 to all of the remote stations 3 including analog inputs 5. The point module 11 selectively connects the lines 17 – 18 and shield 19 for the analog transmission as follows. Module 11 includes an adress decoder 21 coupled to the common bus 9, and a command decoder 22 also connected to bus 9 and to the decoder 21. A message frame directed to the point module 11 will include the corresponding address and a command information. The adress decoder 21 responds and establishes a point enable signal at the output line 23 which activates the module and in particular is shown coupled to command decoder 22. A suitable system is shown in more detail in the copending application of Strojny entitled REMOTE CODED DUAL STATE CONTROLLER APPARATUS, U.S. Pat. Ser. No. 315,447 which was filed on Dec. 15, 1972 the same date as this application and is assigned to the same assignee.

The command decoder 22 selectively establishes an output signal at a pair of output lines 24 and 25. Line 24 controls a switch unit 26 for connecting the analog transmission line 7 to the remote station bus 14.

The coupling point switch unit 26 includes a reed relay 27 which responds to a command signal at line 24 and which includes contacts connected to provide an isolated connection of the transmission line 17 – 18 of trunk 7 to the module 10. The point module relay 27 in particular is a four-contact relay having a winding 28 and first and second sets of contacts 29 and 30 connecting the one transmission wire or conductor 18 and the shield 19 to a common analog ground 31. A common ground wire 32 of the bus line 14 is also connected to ground 31 and provides a common ground for the analog voltage signal. The ungrounded side of the signal is transmitted via the output bus wire 33 and connected by contacts 34 to trunk conductor 17.

The relay winding 28 is connected to a relay drive and latch unit 35, such as a flip-flop latch which couples the relay to power and maintains the connection until specifically cleared by an incoming message frame, as by an input clear line 36. The latch unit 35 is set by the command signal at the command signal line 24 and remains set until cleared by a signal connected via the command signal line 25 and a gate 38. The gate 38 is also connected to bus 9 by a line 38*a* which provides a data available signal from the frame logic 8. The status of the relay 27 may be monitored by status checking reed contact 39 coupled to the winding 28. Contact 39 is connected to actuate an interrupt unit 40. The interrupt unit 40 is connected as at 41 to bus 9 and is operable to establish communication with the loop system and particularly controller 1 to identify such a fault, which would, of course, indicate a failure of the ability of transmitting information from the module 10, for example as disclosed in the previously identified Buchanan et al. application.

Figure 3:
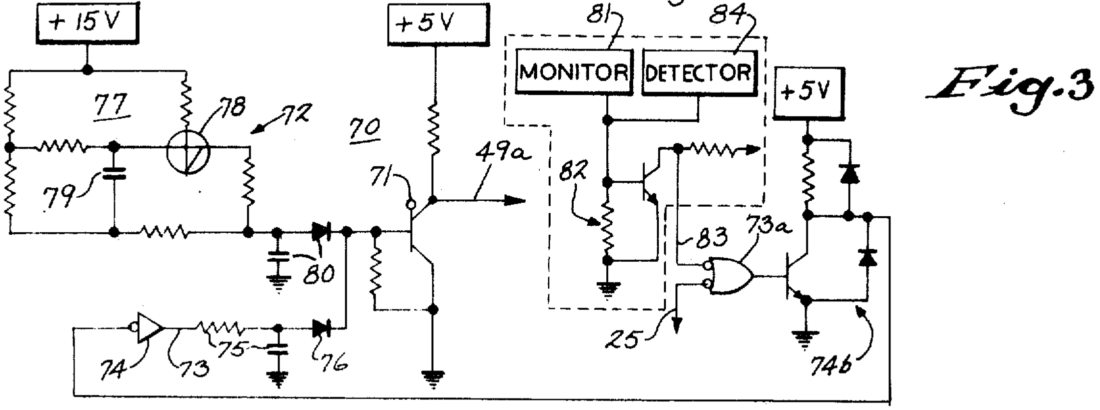
FIG. 3 is a schematic circuit diagram of an analog selection and latch clearing circuit shown in block diagram in FIG. 2.

The analog point module 10, similar to all other point modules, includes a corresponding address decoder 42 and a command decoder 43. The decoder 42 enables the point module 10 and particularly the command decoder 43 to set a pair of output lines 44 and 45. Line 44 is connected to enable an analog select and latch register 46 which selectively connects one of the analog input signal sources 5 to the lines 32 and 33. The analog select and latch register 46 is shown including a plurality of logic flip-flop circuits 47, one for each of the remote point analog transducers 5. Each of the flip-flop circuits 47 is similarly constructed, and thus the connection of the first one into the circuit is described. The circuit 47 includes a data input 48 connected to bus 9 and a clock input 49 for setting of the flip-flop. The clock input 49 responds to the output at the input 48 of the command decoder 43 and the data available signal from bus 9 to set the analog select circuit 46 which remains set until commanded to unlatch by an appropriate signal, established after completion of the conversion from analog to digital is completed, at a common clear input 49*a*; for example, as shown in FIG. 3.

The output of each source is connected by an associated amplifier 50. The output of each select flip-flop 47 is connected to the input of a comparator network 51 which activates an analog point switching circuit 52 and switches the output of amplifier 50 to connecting lines 32 – 33. The solid state switch means 52 may be a field effect transistor, not shown, or similar high-input impedance connecting means for each of the amplifiers 50.

In the illustrated embodiment of the invention, each of the transducers or sources 5 is diagrammatically illustrated as including a variable resistance element 55. The voltage input to the amplifier is directly related to the adjustment or setting of the resistance element 55 and produces an analog voltage signal level which is transmitted by the source amplifier 53 and the field effect transistor switch means 52 to the remote station bus lines 32 –33 and via the coupling point module 11 to the transmission trunk 7.

The point module 10 further includes an analog range and function decoder 56, the output of which is connected to the output bus 9. The range and function decoder 56 is a multiplexing network connected to the output of the analog select flip-flops 47, and selectively connecting a function unit 57 to the bus 9.

The range and function codes for each analog source 5 are encoded at the related remote station 3 in a suitable function unit 57, having a separate code means for each source 5. The decoder 56 is activated by receipt of a message frame at module 10 with a read command which sets read line 45 of command decoder 43. Line 45 is connected to enable the multiplexing network 56 to transmit the range and function information. The information is transmitted via bus 9 over the communication cable 2 to the controller 1 with the high-speed digital information transmittal. This, of course, decreases the memory information which must be stored in the controller with a resulting simplification and reliability of the over-all system.

Thus, by a sequence of the message frames, a particular analog point module 10 – 11 (FIG. 1) is activated to provide the connection of a selected analog source 5 to the transmission trunk 7. The output of the analog transducer or source 5 is then transmitted over trunk 7 to the analog to digital converter unit 6 independently of the communication loop.

The station 3 including the analog to digital converter unit 6 is then activated by a message frame 4 and is operable to complete the conversion. The point module 15 in a frequency to digital converter or one which will include a point module addressing decoder 58 (FIG. 2) and a command decoder 59 connected to activate the module 15 and control the funtioning and mode of operation in response to an appropriate frame 4 received by the local frame handling means 16. As in the other modules, the decoder 58 has a point enable output line 60 connected to enable the command decoder 59 and may also provide an enable to the other components. The command decoder 59 has an initiate or start output line 61 connected through time delay 64 to counter 66 frequency to digital units to change the analog signal into a corresponding multiple bit binary signal for loop communication.

More particularly, the voltage to frequency converter unit 6 includes a guarded input instrumentation amplifier 62 which normally will have a gain of "1" and which is interconnected to create a common mode noise rejection input. Thus, even though the analog transducer 5 is coupled to the transmission trunk 7, the point module 15 must receive a message frame 4 from the loop controller 1 properly addressed and with an initiate command signal to initiate the frequency to digital converter unit 15. The amplifier 62 output is connected to a voltage to frequency converter 63 of any desired construction. The initiate command starts a short time delay determined by delay unit 64. The time delay unit 64 allows the analog signal on trunk 7 to stabilize before conversion is initiated. The converter 63 in particular provides integration for a very precise time period; for example, in a practical application, 16⅔ milliseconds to provide a normal mode noise rejection operation.

The output signal source 5 as applied to the converter unit 6, in a practical construction, may have an output range of zero to plus ten volts D.C. range. The output of the voltage to frequency converter 63 at such ten volt maximum input is 982.98 kiloHz output. The V/F output is counted for 16⅔ msec., providing a binary number at the output of the counter 66, via the time delay unit 64. The analog signal is, therefore, converted by voltage to frequency converter 63 and frequency converter to digitized analog data in the digital counter 66, which is connected to the station bus 15*a* for communication to the loop system and particularly the controller station 1.

The voltage converter 63 with the precise time integration period may produce a conversion resolution equal to or better than plus and minus 0.01 per cent. This permits very accurate conversion of the analog information into digital form, which may, as previously noted, produce a fourteen bit output in counter 66 which can be successively read by a pair of succeeding message frames 4. An interrupt latch 67, such as a flip-flop circuit, has an input connected to the converter unit 6 and detects the completion of the conversion cycle. Upon termination of an analog to digital conversion, the latch 67 generates an interrupt signal at an interrupt line which is transmitted by the station bus 15 a to the frame handling logic circuit 16 at the corresponding remote station 3. This, in turn, continuously requests a message frame from the loop system until the interrupt latch 67 is cleared. The latch 67 has a clear or reset input 68 connected to the command decoder 59 and is thus cleared by an appropriate message frame. When the first available frame 4 is received as a result of the interrupt, the converter point module 15 acknowledges receipt of the frame 4, introduces its address to inform the loop controller of the necessity of a read frame.

The loop controller 1 generates a first frame 4 with a command to clear the interrupt at the analog to digital converter module 15 such that the module terminates the accepting and filling of available frames. The message frame 4 can also command the module to introduce the least significant byte of the fourteen bit data word generated by the converter unit 6 into the data byte of the message frame. The filled frame is transmitted and acknowledged by the loop controller 1 by generating of a second frame with a read command particularly relating to reading of the second or most significant data bits of the 14 bit data word. The point module 15 will, of course, accept this frame, respond to the particular command, and introduce the corresponding binary logic signal into the unit and retransmit it to the loop controller 1 and result in transmission of message frames to the analog source modules 10 and 11 to selectively clear the latched status of the transmitting means.

The loop controller 1 generates a first dedicated clearing frame including the appropriate first station 3 adress with an analog clear command. In the illustrated embodiment, the coupling module 11 and particularly the command decoder 22 is activated to transmit an analog clear signal via the clear line 25 which resets all polnt modules 10 and disconnects the analog source 5 previously connected. This frame 4 does not clear the module 11 if the same remote station 3 is, under the central controller program, to have another analog source 5 read. The analog clear frame 4 is returned to the loop controller indicating the analog clear and controller 1 then generates a subsequent frame to connect a different remote source, in accordance with the programming. The system then recycles to transmit and convert the analog information and transmit the digital information to controller 1. When all of the analog sources 5 at any given remote station 3 have been read, a final clear message frame 4 also generates the analog clear signal at line 25. In addition, a clear signal in the message frame connected to a clear line 38 of the driver latch 35 for coupling relay 27 at the particular remote station.

The programmer and controller 1 then can continue scanning of a second remote station 3, proceeding with the necessary scanning of all of the points or sources therein. In each instance, the communication loop merely latches the separate analog system into operation and responds to a completion message to read the results. All of this can, of course, employ the high-speed capability of the digital communication network and free the latter for other work while the relatively low-speed analog transmission and conversion is being completed.

In a preferred construction of the present invention, a special analog clear circuit 70 including a power monitoring system is provided and acturated by the decoder 22 of FIG. 2, such as shown in FIG. 3. The clear circuit 70 includes a logic gating transistor 71 controlled by a power-up voltage monitoring branch 72 and a clear signal branch 73 which are connected in common to the base of the transistor 71. The analog clear line 25 from the select module 10 is connected to a NAND input gate 73*a*. The NAND output is connected to a transistor driver circuit 73*b* connected to actuate transistor 71 as follows:

The illustrated transistor 71 is a conventional NPN transistor properly connected to the power supply. When the transistor 71 is turned off, a logic "1" or a relatively high level signal appears at the output and enables the flip-flops. When the transistor 71 is biased on, the collector is effectively at logic ground and the clear logic line and terminal 49*a* is correspondingly at a logic "0" to clear the flip-flops 47.

The logic clear signal branch 73 includes an inverter 74 connected to the incoming logic signal and a coupling network 75 consisting of a series resistor and a shunt capacitor to logic ground. A diode 76 connects the network to the transistor 71. When a clear logic "0" signal is applied to the inverter, a positive pulse signal is coupled to the base of the transistor 71 through the isolating diode 76 and drives the transistor 71 to conduct and establish a clear signal at line 49*a*, thereby clearing a set flip-flop analog select latch 47.

The power monitoring reset circuit 72 includes a pulse network 77 which connects the positive power supply to the base of transistor 71. The network 77 includes a pair of parallel resistance branches, one of which includes a unilateral three-terminal gate switch 78 and the other of which includes a capacitor 79. The branch circuits are connected to the transistor 71 by a network 80 similar to that of branch 71. Switch 78 initially conducts until capacitor 79 charges to cutoff. In this manner, a power-up reset pulse is generated when the power is initially turned on. Transistor 71 is energized with a clear signal at line 49*a* being transmitted to the analog latch circuit 46 via the line driver circuit 73*b*. The reset insures that no analog point is inadvertently selected but rather requires that the system properly sequence, through the several analog points in accordance with the programming of the network communication system.

The related analog select board 10 may include a similar other suitable monitoring circuit 81, with its output connected by a coupling transistor 82 similar to transistor 71 to a second input line 83 to the NAND gate 73*a*.

The illustrated point module also includes a frame failure logic or interlock unit 84 having an input connected to the reset line of the bus 9 and an output line 85 connected to reset the relay driver and latch 35, as shown in FIG. 1. If an analog source remote station 3 should be automatically disconnected from the communication with the relay energized, the analog transmission system would be unavailable for processing of other stations. Unit 84 is, therefore, also connected to clear the latch 35 and thereby automatically de-energizes the trunk relay coil 28 under such a fault condition. The analog select circuit 46 is also cleared, as follows. This, the output line 85 of the unit 84 is also connected to the base of transistor 82 through a suitable diode means or the like, not shown. The transistor 82 is connected by gate 73*a* to actuate driver 74*b* to clear the unit 46.

The system may include an inoperative remote station by-pass with a voltage monitoring means 86 connected to a by-pass relay unit 87, such as disclosed in the Buchanan et al. application.

Figure 4:
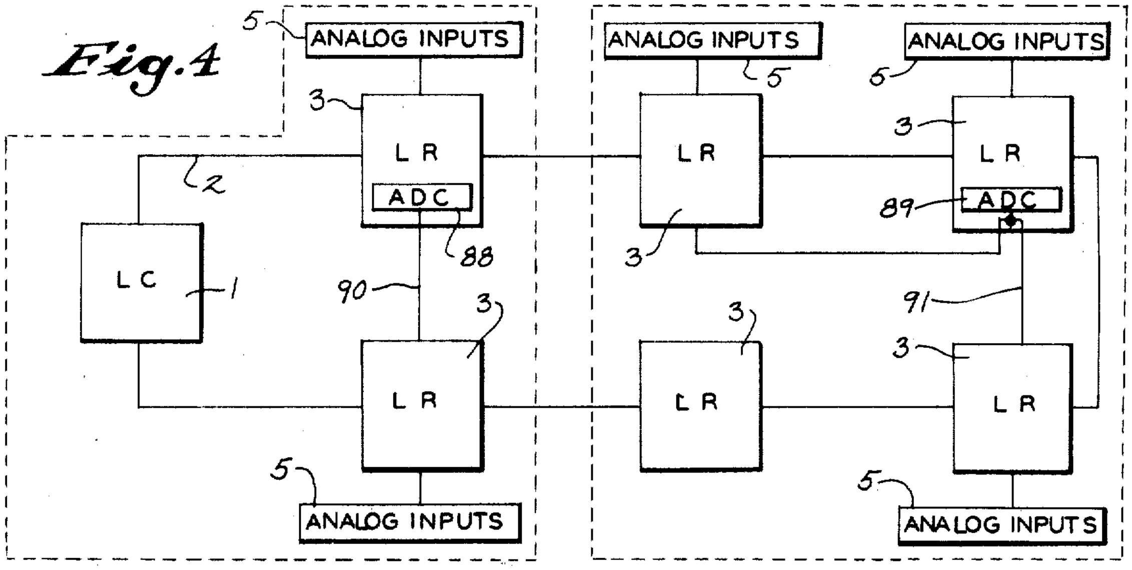
FIG. 4 is a view similar to FIG. 1 showing a modification to the communication system employing a pair of analog to digital converters.

Although shown in FIGS. 1 – 3 with a single analog to digital converter interconnected to service all of the remote stations 3 including analog inputs, the present system obviously is readily adapted to the use of one or more additional analog to digital converting units interconnected to selected remote stations. For example, in FIG. 4 the loop system is provided with a pair of converters 88 and 89 at different stations 3 and connected via separate trunks 90 and 91 to service different sources.

In the ultimate, of course, each remote station 3 having an analog input can be provided with its own analog to digital converter with appropriate coded logic switching controls. Thus, as noted previously, with present day technology, the analog to digital conversion apparatus desirably employed to produce the necessary resolution makes such a construction prohibitively expensive. However, if technology should provide a sufficiently inexpensive converter, the present analog control and transmission systems constructed in accordance with this invention can be readily and directly adapted to such a modification.

Thus in the present system, the analog measurement and transmission is controlled by the high-speed digital communication system. However, the analog signal transmission and conversion is separately implemented such that the efficiency of the high-speed digital communication system is not limited. Further, the separate interrelated system provides for optimizing the construction of each and thereby permits reliable, error-free operation with a very high degree of accuracy.

The present invention, thus, provides a reliable and relatively inexpensive means of providing for the efficient processing of analog information in a digital control and communication system.

Various modes of carrying out the invention are contemplated as being within the scope of the following claims particularly pointing out and distinctly claiming the subject matter which is regarded as the invention.

I claim:

1. In a data communication apparatus employing high speed digitally encoded information data for controlling a plurality of controlled stations connected by a communication loop to controller station, at least one of said stations including an analog source means, the improvement in the method of transmitting and converting analog information comprising a separate analog signal transmission means including an analog to digital signal converting means, each of said stations having an analog source means including coupling means connecting said transmission means to the source means, said coupling means including a decoding means connected to said communication loop for selective activation to latch the source means to the transmission means, and interrupt means coupled to the converting means and connected to the communication loop for transmitting of the converted analog signal over the communication loop.

2. The data communications apparatus of claim 1 including status monitoring means at each station having a source means connected to coupling means and responsive to a malfunction in the analog transmission to establish communication with the controller station over the communication loop.

3. The data communication apparatus of claim 1 wherein each of said source means remote stations includes function and range coded means for the corresponding source means, said decoder means including means for selectively transmitting the function and range control information for the related source means to the controller station.

4. The data communication apparatus of claim 3 wherein each source means includes a plurality of individual analog sources and a corresponding function and coded means, said decoding means including means to selectively connect the sources to said transmission means and to connect the code means to the communication loop.

5. The data communication apparatus of claim 1 wherein said separate transmission means including a coaxial shielded cable having a pair of twisted transmission conductors, the analog to digital converting means includes an instrumentation amplifier having a guarded input shield connected to said transmission cable, said coupling means including contact means connected to source means and individually and selectively interconnecting said shield and said transmission conductors to said source means and including connection of one of the conductors and the shield to a common ground at the transmitting station.

6. The data communication apparatus of claim 1 wherein each source means includes a plurality of individual analog sources, said coupling means including a common connecting means to said transmission means and individual connecting means from the analog sources to said common connecting means, said decoding means having first coded means for activating said common connecting means and second coded means for activating said individual connecting means, said individual connecting means being activated in sequence in response to activation of said common connecting means.

7. The data communication apparatus of claim 1 wherein said coupling means includes a relay means connected to the decoding means and having switch means connecting the source means to the transmission means to isolate the stations and prevent circulating direct current.

8. The apparatus of claim 7 wherein the coupling means continuously monitors the status of the relay means and operable to generate an interrupt signal in response to a failure of the relay means to respond to an input command for corresponding communication with the controller station.

9. The apparatus of claim 1 wherein the coupling means establishes an isolated direct current connection and includes means to continuously monitor the transmission of an analog signal and operable to generate an interrupt signal for communication with the controller station in the event of the failure of a source means to respond to the decoding means to transmit the analog signal.

10. The apparatus of claim 1 wherein each station includes a by-pass means to operatively disconnect the station and the coupling means further includes deactivating means responsive to the operable disconnect of the corresponding remote station from the communication loop.

11. In the data communication apparatus of claim 1 including a second analog to digital converting means, and a second trunk means, first of said remote stations being solely connected to the first trunk means and second of said remote stations being solely connected to the second trunk means.

12. In a data communication apparatus employing digital data communication bits and a communication cable means interconnecting a plurality of remote stations and at least one controller station, at least one of said remote stations including analog source means, the improvement in the method of transmitting and converting analog information of said source means comprising an analog to digital converting means at one of said stations, an analog signal transmission trunk means separate from said communication cable means and interconnecting selected remote stations to said one station, each one of said selected remote stations having an analog transmission trunk connection means connected to said transmission trunk and having an input means, said connection means including a decoding means connected to said loop communication system for selective activation of the connection means, an analog transmitting means connected to the source means and to said input means, said transmitting means including a decoding and latch means for selective interconnection of said source means to said input means for operative connection to the transmission trunk means.

13. The apparatus of claim 12 wherein said analog to digital converting means includes time delay means to permit the analog signal on the transmission trunk to stabilize before the analog to digital conversion is initiated.

14. The apparatus of claim 12 wherein said communication network includes a loop controller generating message frames for successive reading of the output of the analog sources and including means for generating a first message frame addressed to a selected remote station and including a point module address directed to the analog trunk connection means for interconnecting of the transmission line to the corresponding remote station, said loop controller transmitting a second message frame to the corresponding remote station and addressed to the analog point module for connecting a selected analog signal to the remote station bus and thereby interconnecting the output to the transmission trunk, said loop controller generating a third frame addressed to the remote station including the analog to digital converting means and instructing it to initiate the conversion.

15. The data communication apparatus of claim 12 wherein said communication cable means interconnects said controller station in a serial loop with said remote stations, each of said remote stations includes a plurality of load means grouped in operational point modules, each having a unique coded address within said remote station, said controller station generating time spaced message frames each of which includes a plurality of successive multiple bit bytes for sequentially addressing a remote station and a point module within the addressed remote station and further commanding said module in accordance with predetermined available functions, and having an analog select point module selectively connecting one of a plurality of analog sources to a common output to define said transmitting means, a separate point module for controlling said analog to digital converting means, said module including means responsive to completion of a conversion to establish a frame request signal coupled to the cable means to obtain available frames and to retransmit such frames as filled frames including the corresponding station and module address, said controller station responding by transmitting of message frames to said converting means module to obtain the converted data and reset the module and to said analog select module and said analog connect module to reset said modules.

16. The communication apparatus of claim 12 wherein said communication network includes a plurality of analog sources at one remote station and a common analog select point module for controlling the coupling of the sources to the trunk connection means, said remote stations each including message frame logic handling means and said controller station includes a loop controller generating message frames addressed to a selected remote station and said point module for first activating of the analog connection means thereafter the analog select point module for connecting a selected analog signal to the connection means.

17. The communication apparatus of claim 16 wherein said analog select point module includes a source amplifier for each source, and a high impedance switch means connecting the source amplifier to the connection means, said select point module including a latch means for each source connected to the frame handling means and operable to enable the corresponding switch means.

18. The communication apparatus of claim 17 wherein said analog select point module includes a range and function encoding storage unit having corresponding digitally encoded information for each source, said storage unit being connected to the frame handling means for selective transmission of such information to a message frame, said storage unit being connected to the output of the latch means for selection in accordance with the enabled source, and said point module having a command decoder responsive to selectively actuate the analog select latch means and said storage unit.

19. The apparatus of claim 14 wherein an analog select module includes a latch means operable to selectively connect the corresponding source to the connection means and said connection means forms a separate connection point module having a separate module address, said connection point module including a clear analog pulsing network having an input adapted to receive a clear logic signal and connected to the select module and transmitting a pulse signal to correspondingly activate the switch to selectively clear the analog latch means.

20. The apparatus of claim 19 wherein said clear analog pulsing network includes a voltage monitoring circuit connected to the analog operating voltage supply and including a power-up reset circuit wherein a reset pulse is generated in response to the application of power to clear all analog points to prevent an inadvertent selection of an analog source.

21. The apparatus of claim 19 wherein the analog select module includes a plurality of latching flip-flops, one for each of the analog sources, each of said flip-flops having a reset input connected in common to a clear signal line and having a clock input connected in common to an analog select command for simultaneous activation of the flip-flops with a logic non-select input to all four of the flip-flop circuits to thereby clear the selection latch means.

22. The apparatus of claim 12 wherein the connection means includes means to continuously monitor the transmission of an analog signal and operable to generate an interrupt signal for communication with the loop controller in the event of the failure of an analog point moduel to respond to the decoding means to transmit the analog signal.

23. The apparatus of claim 12 wherein the connection means continuously monitors the status of the connection means and having an interrupt signal generating means responsive to the failure of the connection means to respond to an input command to generate an interrupt signal for corresponding communication with the loop controller and operable to transmit a fault status thereof to the loop controller.

24. The data communication apparatus of claim 12 wherein said analog to digital converter means includes a guarded input instrumentation amplifier having a gain of "1" and connected to the receiving lines in a common mode noise rejection input, a voltage to frequency converter having a precise integration period and operating in a normal rejection mode to establish a digital output, a register means connected to the converter and storing the analog information in digital form for retrieval by the communication loop.

25. The apparatus of claim 12 wherein said analog to digital converter means includes a latch means, a decoding means connected to the communication cable means and to the latch means for selective enabling and initiation of the operation of the analog to digital converter means, said analog to digital converter means having means to detect the termination of a conversion of analog information into a corresponding digital output, and interrupt signal means connected to the analog to digital converter and generating an interrupt signal to establish communication with said communication network in response to completion of the conversion for transfer of said digitized analog signal and clearing of the analog station and the converting station.

26. The apparatus of claim 25 wherein said loop controller means directs a first message frame to the analog to digital converter to clear said interrupt signal and read a first portion of the digitized output and subsequently directs a second frame to read a second portion of the digitized output.

27. The data communication apparatus of claim 12 wherein the controller station and plurality of remote stations are connected in a serial loop by said cable means, said remote stations having a plurality of load means divided into functional point modules, said load means at selected stations including a plurality of analog sources, said remote stations having a station decoder and a common point module bus, said transmitting means defining an analog point module having a plurality of latch means, one for each analog source, a point module address decoder connected to said bus and establishing an analog select enable signal, a command decoder connected to said bus and establishing an analot select signal at one output and a read output at a second output, a plurality of latch circuits and each of said sources and having separate data inputs and source select outputs, a high impedance switching circuit connected to the latch means and including a source amplifier for coupling of the source to the trunk connection means, a function and range unit having a selection input means connected to the output of said latch means and including a multiplexing connection to the bus for transmitting the function and range control information for the selected analog source to the controller, said trunk connection means including a relay means having contacts connected to said trun and said switching circuit and having a relay driver for D.C. isolation of the trunk and cable means, said decoding means including a module address decoder and a command decoder connected to said bus and establishing a relay latch set output and an analog clear output connected to clear said plurality of latch means, a relay latch means connected to the set output to operate the relay, said relay latch means having a clear input connected to said bus, said analog to digital converter means including a point module having an address decoder and a command decoder establishing a conversion start output, a read output, interrupt signal means connected to the analog to digital converter means and generating an interrupt signal to said communication network in response to completion of the conversion and operable to obtain and transmit a message frame to signal the loop controller of the completion of the analog to digital conversion, said loop controller directing message frames to read the converted output and to clear the analog select module and the converter module.

28. The apparatus of claim 27 wherein the analog to digital converter unit includes an instrumentation amplifier having a guarded input shield connected to said trunk means, said trunk means being a coaxial shielded cable having a pair of twisted transmission conductors, said relay means including three sets of contacts individually connected to said shield and to each of said transmission conductors with a connection of one of the conductors and the shield to a common ground at the remote station and the other conductor individually connected to the high impedance switching circuit.

29. The apparatus of claim 28 wherein the converter unit includes a voltage to frequency converter having a precise integration time connected to the output of the receiving instrumentation amplifier and establishing a normal noise rejection, said guarded input intrumentation amplifier having a gain of "1" and connected to the receiving lines in a common mode noise rejection input, a register connected to the voltage to frequency converter to store the digitized analog signal for transmission to the loop controller.

30. The apparatus of claim 28 wherein said loop controller generates a message frame directed to the analog to digital converter means and having means to clear the interrupt at the module and simultaneously introducing the digital bit information into the message frame for retransmission to the loop controller, said loop controller generating a second frame with a special command to the corresponding analog to digital point module to read additional digital data information, said loop controller then generating a message frame directed to the remote station including the activated connection means and including a command to disconnect the activated analog transducer point module connection from the bus and automatically permitting the connection of a second analog point at the remote station to the trunk via the connection means, said loop controller sequentially scanning the analog point modules in a remote station, the reading of the last analog point module in a remote station resulting in activating the loop controller to generate a special clear frame adapted to deactivate and clear the connection means as well as to clear all analog connections, said controller then scanning the analog modules at a different remote station having analog sources.

31. The apparatus of claim 28 having station means, by-pass connection means disconnecting of the corresponding remote station from the serial in response to a failure at the remote station, and means connected to said relay latch means to positively deenergize the latch means in response to an activating of said by-pass connection means of the remote station.

32. The apparatus of claim 28 having a status sensing relay including a relay coil contact in circuit with said relay means and having sensing contacts, interrupt means connected to detect the status of said contacts and to said bus for transmitting an interrupt signal and filling and transmitting a message frame to the loop controller.

33. In the data communication apparatus of claim 1 wherein said interrupt means includes means to sense completion of the conversion of an analog signal to a digitally encoded signal to initiate communication with the controller station via the communication loop.

34. In a data communication system having an analog transmission cable for interconnecting of a remote analog source to a remotely located analog to digital converter comprising an instrument amplifier having a guarded input shield connected to said transmission cable, said transmission cable including a coaxial shielded cable having a pair of twisted transmission conductors, a high impedance switching circuit, a switching means including a plurality of sets of contacts individually connected to the shield and each of the transmission conductors with a connection of one of the conductors and the shield to a common ground at the analog source and the other conductor individually connected to a high impedance switching circuit.

* * * * *